(12) United States Patent
Aruga (10) Patent No.: US 9,004,665 B2
(45) Date of Patent: Apr. 14, 2015

(54) INK JET RECORDING INK AND INK JET RECORDING SYSTEM

(71) Applicant: Seiko Epson Corporation, Tokyo (JP)

(72) Inventor: Tomohiro Aruga, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/070,906

(22) Filed: Nov. 4, 2013

(65) Prior Publication Data

US 2014/0125743 A1 May 8, 2014

(30) Foreign Application Priority Data

Nov. 2, 2012 (JP) ................................. 2012-242485

(51) Int. Cl.
| | | |
|---|---|---|
| *G01D 11/00* | (2006.01) | |
| *C09D 11/30* | (2014.01) | |
| *B41J 2/175* | (2006.01) | |
| *C09D 11/322* | (2014.01) | |

(52) U.S. Cl.
CPC .............. *C09D 11/30* (2013.01); *B41J 2/17503* (2013.01); *C09D 11/322* (2013.01)

(58) Field of Classification Search
USPC ........... 347/95, 96, 100, 101, 102; 106/31.13, 106/31.28, 31.3
See application file for complete search history.

(56) References Cited

U.S. PATENT DOCUMENTS

| | | | |
|---|---|---|---|
| 5,686,947 A | 11/1997 | Murray et al. | |
| 7,296,883 B2 * | 11/2007 | Kanaya et al. | ................ 347/100 |
| 7,944,910 B2 * | 5/2011 | Umeda | ......................... 370/352 |
| 8,147,020 B2 * | 4/2012 | Kariya | ............................. 347/14 |
| 8,454,150 B2 * | 6/2013 | Komatsu | ....................... 347/102 |
| 8,741,049 B2 * | 6/2014 | Saito et al. | ................ 106/31.89 |
| 2004/0249018 A1 | 12/2004 | Kataoka et al. | |
| 2010/0166962 A1 | 7/2010 | Ohzeki | |
| 2011/0227994 A1 | 9/2011 | Yanagi | |
| 2012/0076951 A1 | 3/2012 | Tojo et al. | |

FOREIGN PATENT DOCUMENTS

| | | |
|---|---|---|
| EP | 2412766 A1 | 2/2012 |
| EP | 2489707 A1 | 8/2012 |
| JP | 11-504874 A | 5/1999 |
| JP | 2003-261805 A | 9/2003 |

(Continued)

OTHER PUBLICATIONS

Extended European Search Report mailed Jan. 5, 2015 for Application No. EP13191085.3 (4 pages).

*Primary Examiner* — Anh T. N. Vo
(74) *Attorney, Agent, or Firm* — Nutter McClennen & Fish LLP; John J. Penny, Jr.; Joshua I. Rudawitz (57) ABSTRACT

An ink jet recording ink according to this invention is an ink jet recording ink to be contained in an ink containing vessel, in which the ink containing vessel has an ink containing chamber containing the ink and an air introduction flow path which introduces air into the ink containing chamber through the ink contained in the ink containing chamber, the ink contains a self-dispersion pigment, resin particles having a glass transition temperature of 10° C. or lower, and wax particles whose specific gravity is smaller than the specific gravity of a main solvent, and a ratio (R1/R2) of the volume average particle size (R1) of the resin particles and the volume average particle size (R2) of the wax particles is 1.0 or lower.

12 Claims, 3 Drawing Sheets

(56) References Cited

FOREIGN PATENT DOCUMENTS

| JP | 2010-023362 A | 2/2010 |
| JP | 2010-155359 A | 7/2010 |
| WO | 96/34761 A1 | 11/1996 |

* cited by examiner

INK JET RECORDING INK AND INK JET RECORDING SYSTEM

Priority is claimed under 35 U.S.C. §119 to Japanese Application No. 2012-242485 filed on Nov. 2, 2012, which is hereby incorporated by reference in its entirely.

BACKGROUND

1. Technical Field

The present invention relates to an ink jet recording ink and an ink jet recording system.

2. Related Art

Heretofore, so-called ink jet recording methods of recording images and the like by minute ink droplets discharged from an ink jet recording head are widely known.

Among the above, a method of supplying an ink to an ink jet recording head has been variously examined. For example, a method of supplying ink to a head through a tube from an ink tank containing the ink and the like are known. Some of such ink tanks have a structure such that the ink tanks can be refilled with ink, so that a user can refill the ink tanks with ink without exchanging the ink tanks (JP-T-11-504874).

As the ink for use in the ink jet recording methods, one in which a coloring material (e.g., a pigment or a dye) is dispersed or dissolved in a solvent (water or an organic solvent) has been used. Among the coloring material contained in such ink, a so-called pigment ink containing a pigment as the coloring material is known because the performance, such as lightfastness, is good (JP-A-2010-155359). Since the pigment ink is not good in fixability to a recording medium in many cases as compared with a dye ink containing a dye as the coloring material, the pigment ink contains a resin for fixing the ink.

However, for the ink tank described in JP-T-11-504874, an ink tank whose capacity is higher than that of an ink tank (e.g., usual ink cartridge) having no structure of recharging the ink tank with ink is used in many cases, the contact surface of the ink liquid surface and air (i.e., area of a gas-liquid interface) becomes large within the ink tank in some cases.

Thus, the evaporation amount of the moisture increases near the ink liquid surface. Therefore, when the pigment ink described in JP-A-2010-155359 described above is used, an aggregate resulting from the resin contained in the pigment ink is likely to be generated near the ink liquid surface in some cases. When the aggregate is generated as described above, the aggregate blocks the head, for example, so that poor ink discharge is likely to occur.

On the other hand, the ink tank described in JP-T-11-504874 described above is one in which air (air bubbles) are likely to be mixed into ink due to the configuration thereof.

Specifically, the ink tank described in JP-T-11-504874 has an air hole and has a structure such that when the ink in the ink tank is supplied to the head, air is introduced into the ink tank from the air hole. In particular, when the air hole is provided at a position where air is introduced into the ink tank through ink, air (air bubbles) is likely to be mixed into the ink.

When refilling the ink tank with ink, air (air bubbles) is likely to be mixed into the ink in the ink tank.

The air bubbles mixed into the ink as described above are usually discharged above the ink liquid surface in the ink tank. However, when an aggregate is present in the ink, the air bubbles in the ink adhere to the aggregate to stay in the ink. In such a case, the air bubbles in the ink are introduced to the head to cause poor discharge in some cases.

SUMMARY

An advantage of some aspects of the invention is to provide an ink jet recording ink which has good adhesiveness (abrasion resistance), can suppress the generation of an aggregate, and has good discharge stability and an ink jet recording system.

The invention can be realized as the following aspects or application examples.

Application Example 1

According to one aspect of an ink jet recording ink according to the invention is an ink jet recording ink to be contained in an ink containing vessel, in which the ink containing vessel has an ink containing chamber containing the ink and an air introduction flow path which introduces air into the ink containing chamber through the ink contained in the ink containing chamber and the ink contains a self-dispersion pigment, resin particles having a glass transition temperature of 10° C. or lower, and wax particles whose specific gravity is smaller than the specific gravity of a main solvent and a ratio (R1/R2) of the volume average particle size (R1) of the resin particles and the volume average particle size (R2) of the wax particles is 1.0 or lower.

According to the ink jet recording ink of Application Example 1, the generation of an aggregate can be suppressed, the discharge stability is good, and an image having good adhesiveness (abrasion resistance) is obtained.

Application Example 2

In Application Example 1, a compound in which the weight change when the compound is held in an equilibrium state at 25° C. at 60% RH, and then left standing for 24 hours under the conditions of 25° C. and 70% RH and the conditions of 25° C. and 30% RH is in the range of ±10% and the remaining moisture amount when a 50% by mass aqueous solution thereof is left standing for 24 hours under the conditions of 30° C. and 35% RH is 10% or more may be contained.

Application Example 3

In Application Example 2, the compound can be an amphoteric compound.

Application Example 4

In any one example of Application Example 1 to Application Example 3, the wax particles can be a polyolefin wax or a paraffin wax.

Application Example 5

One aspect of an ink jet recording system according to the invention contains an ink containing vessel containing the ink of any one example of Application Example 1 to Application Example 4, an ink jet recording head for discharging the ink supplied from the ink containing vessel, and an ink supply path for supplying the ink to the head from the ink containing vessel in which the ink containing vessel has an ink containing chamber containing the ink and an air introduction flow path for introducing air into the ink containing chamber through the ink contained in the ink containing chamber.

Application Example 6

In Application Example 5, a ratio (A/B) of the area (A) of the horizontal cross section inside the ink containing chamber when supplying the ink to the head and the area (B) of the cross section of the ink supply path may be 300 or more.

Application Example 7

In Application Example 5, a ratio (C/B) of the area (C) of the horizontal cross section inside the ink containing chamber when injecting the ink into the ink containing chamber and the area (B) of the cross section of the ink supply path may be 900 or more.

Application Example 8

In Application Example 5, a ratio (C/A) of the area (A) of the horizontal cross section inside the ink containing chamber when supplying the ink to the head and the area (C) of the horizontal cross section inside the ink containing chamber when injecting the ink into the ink containing chamber may be 2.5 or more.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferable embodiments of the invention are described. The embodiments described below describe an example of the invention. The invention is not limited to the following embodiments and also includes various modifications enforced in a range where the scope of the invention is not altered.

1. Ink Jet Recording Ink

An ink jet recording ink according to one embodiment of the invention contains a self-dispersion pigment, resin particles having a glass transition temperature of 10° C. or lower, and wax particles whose specific gravity is smaller than the specific gravity of a main solvent in which the ratio (R1/R2) of the volume average particle size (R1) of the resin particles and the volume average particle size (R2) of the wax particles is 1.0 or lower and the ink jet recording ink is contained in an ink containing vessel having an ink containing chamber and an air introduction flow path for introducing air into the ink containing chamber through the ink contained in the ink containing chamber.

Hereinafter, components contained in the ink jet recording ink according to this embodiment are described in detail.

1.1. Self-Dispersion Pigment

The ink jet recording ink according to this embodiment contains a self-dispersion pigment. The self-dispersion pigment is a pigment which can be dispersed in an aqueous medium without a dispersant. Herein, "dispersed in an aqueous medium without a dispersant" refers to a state where even when a dispersant for dispersing the pigment is not used, the pigment is stably present in an aqueous medium due to a hydrophilic group on the surface.

The self-dispersion pigment can have a hydrophilic group on the pigment surface. The hydrophilic group on the pigment surface is preferably one or more hydrophilic groups selected from the group consisting of —OM, —COOM, —CO—, —SO$_3$M, —SO$_2$M, —SO$_2$NH$_2$, and —RSO$_2$M, —PO$_3$HM, and —PO$_3$M$_2$, —SO$_2$NHCOR, —NH$_3$, and —NR$_3$ (M in the formulae represent a hydrogen atom, an alkaline metal (e.g., lithium, sodium, and potassium), ammonium, a phenyl group which may have a substituent group, or organic ammonium and R represents an alkyl group having 1 to 12 carbon atoms or a naphthyl group which may have a substituent group).

The self-dispersion pigment is produced by, for example, performing physical treatment or chemical treatment to bond (graft) the hydrophilic group onto the pigment surface. As the physical treatment, vacuum plasma treatment and the like can be mentioned, for example. As the chemical treatment, a wet oxidation method of oxidizing by an oxidizer in water, a method of bonding p-aminobenzoic acid to the pigment surface to thereby bond a carboxyl group through a phenyl group, and the like can be mentioned, for example.

The self-dispersion pigment is good in re-dispersibility as compared with a resin dispersion pigment. Herein, the "resin dispersion pigment" refers to one in which a pigment is dispersed by resin or a surfactant and also includes one in which a pigment is covered with resin by an acid deposition method, a phase inversion emulsification method, and the like.

A reason why the self-dispersion pigment is good in re-dispersibility as compared with the resin dispersion pigment is imagined as follows. More specifically, when an ink containing the resin dispersion pigment dries in an ink flow path or the ink tank, components, such as resin originating from the resin dispersion pigment, tend to be easily entangled with each other. Therefore, it is considered that even when ink is newly supplied into the ink flow path or the ink tank, the resin dispersion pigments (aggregate) which dry and are entangled become difficult to be unbonded (i.e., become difficult to be re-dispersed), and therefore the discharge stability of the ink is impaired. In particular, since the ink containing vessel described later has a large gas-liquid interface area, the ink is likely to dry. Thus, when the resin dispersion pigment is used, the discharge stability of the ink is remarkably reduced.

On the other hand, in a case where the self-dispersion pigment is used, even when the pigments aggregate due to the drying of the ink, the pigments are easily dispersed by the supply of a new ink because components, such as resin, are not used when dispersing the pigment. Therefore, when the ink containing the self-dispersion pigment is used for the ink containing vessel described later, the discharge stability of the ink can be made good.

As the pigment, all the known pigments, such as inorganic pigments and organic pigments, can be used. The inorganic pigments include, but not limited to the following substances, titanium oxide, iron oxide, calcium carbonate, barium sulfate, aluminum hydroxide, barium yellow, cadmium red, chrome yellow, carbon black, Prussian blue, and metal powder, for example.

The organic pigments include, but not limited to the following substances, an azo pigment, a polycyclic pigment, a nitro pigment, a nitroso pigment, aniline black, and the like, for example. Among the above, at least either the azo pigment or the polycyclic pigment is preferable. Among the above, the azo pigment includes, but not limited to the following substances, azo lake, an insoluble azo pigment, a condensed azo pigment, and a chelate azo pigment, for example. The polycyclic pigment includes, but not limited to the following substances, a phthalocyanine pigment, a perylene pigment, a perinone pigment, an anthraquinone pigment, a quinacridone pigment, a dioxazine pigment, an indigo pigment, a thioindigo pigment, an isoindolinone pigment, a quinophthalone pigment, an azomethine pigment, a rhodamine B lake pigment, and the like, for example.

The content of the self-dispersion pigment can be set as appropriate as desired and, for example, can be 1% by mass or more and 20% by mass or lower and further 1% by mass or more and 10% by mass or lower based on the total mass of the ink.

1.2. Resin Particles

The ink jet recording ink according to this embodiment contains resin particles having a glass transition temperature (Tg) of 10° C. or lower. The resin particles have an action of solidifying ink, and further firmly fixing an ink solidified substance on a recording medium.

The glass transition temperature of the resin particles is 10° C. or lower and is preferably 0° C. or lower, more preferably −10° C. or lower, and still more preferably −20° C. or lower. Due to the fact that the glass transition temperature of the resin particles is 10° C. or lower, the adhesiveness of the ink to a recording medium becomes good, so that an image having good abrasion resistance can be obtained. On the other hand, when the glass transition temperature of the resin particles exceeds 10° C., there is a tendency such that the adhesiveness of the ink decreases, and the abrasion resistance of an image to be recorded decreases.

Mentioned as components constituting such resin particles are, for example, fiber resin, such as acrylic resin, styrene acrylic resin, rosin modified resin, phenol resin, terpene resin, ester resin, amide resin, epoxy resin, urethane resin, vinyl chloride vinyl acetate copolymer resin, and cellulose acetate butyrate, vinyltoluene-α-methylstyrene copolymer resin, and the like. These resins may be used singly or as a mixture of two or more kinds thereof. Among these resins, the urethane resin and the acrylic resin are preferably used from the viewpoint that the re-dispersibility is good.

The resin particles are preferably contained in the ink in a fine particle state (i.e., an emulsion state or a suspension state). Due to the fact that the resin particles are contained in a fine particle state, the viscosity of the ink is easily adjusted in such a manner as to be in a range suitable for an ink jet recording system and further the storage stability and the discharge stability are difficult to decrease in some cases.

For the resin particles, commercially-available items can be used and, for example, resin emulsion, such as Superfex Series manufactured by Daiichi Kogyo Seiyaku Co., Ltd. and Mowinyl Series manufactured by Nippon Synthetic Chemical Industry Co., Ltd., can be used.

The volume average particle size of the resin particles is preferably 20 nm or more and 120 nm or lower and more preferably 40 nm or more and 80 nm or lower from the viewpoint that the abrasion resistance of an image to be recorded can be increased. The volume average particle size of the resin particles can be measured by a particle size distribution meter employing a dynamic light scattering method as the measurement principle (e.g., "Microtrac UPA" manufactured by Nikkiso Co., Ltd.), for example.

The content of the resin particles is preferably 1% by mass or more and 3% by mass or lower in terms of the solid content based on the total mass of the ink. When the content of the resin particles is in the range mentioned above, there is a tendency such that the function of the resin particles is favorably demonstrated, and an image having better abrasion resistance is obtained.

1.3. Wax Particles

The ink jet recording ink according to this embodiment contains wax particles whose specific gravity is smaller than the specific gravity of a main solvent. When the wax particles whose specific gravity is smaller than the specific gravity of the main solvent are contained, the discharge stability of the ink can be remarkably increased. A detailed reason has not been clarified yet but is estimated as follows. The wax particles whose specific gravity is smaller than the specific gravity of the main solvent is likely to be present on the ink liquid surface in the ink containing vessel. On the other hand, on the ink liquid surface, an aggregate resulting from the resin particles is likely to be generated. In such a case, it is estimated that when a large number of the wax particles are present near the ink liquid surface, the wax particles enter between the resin particles and the pigment, and the generation of the aggregate resulting from the resin particles which is likely to be generated near the ink liquid surface can be suppressed.

The specific gravity of the wax particles according to this embodiment is smaller than the specific gravity of the main solvent, and a specific gravity difference is preferably 0.05 or more and more preferably 0.1 or more. When the specific gravity difference is 0.05 or more, there is a tendency such that the effects of the wax particles are further demonstrated.

Herein, the "main solvent" in the invention refers to one whose content in a liquid medium contained in the ink is the largest.

Usable as components constituting the wax particles are, for example, natural waxes, such as montan wax, paraffin wax (e.g., paraffin wax, paraffin mixed wax, and the like), plant and animal waxes (e.g., carnauba wax, candelilla wax, beeswax, rice wax, and lanolin), semi-synthetic waxes, such as amide wax and modified montan wax, and synthetic waxes, such as olefin waxes (e.g., polyethylene wax, oxidized high-density polyethylene wax, polypropylene wax, and polypropylene mixed wax). These components may be used singly or as a mixture of two or more kinds thereof. Among the above, the polyolefin wax or the paraffin wax can be preferably used from the viewpoint of further improving the effects described above.

As the wax particles, commercially-available items can also be used as they are, and, for example, Nopcoat PE M17 (Product name, manufactured by San Nopco Limited), Chemipearl W100, W200, W300, W400, W401, W4005, W500, W700, W800, W900, and W950 (Product names, manufactured by Mitsui Chemicals, Inc.), AQUACER 507, 515, 531, 537, 539, and 552, AQUAMAT 208, 263, and 270, CERAFLOUR 990, and 995 (All Product names, manufactured by BYK Chemie Japan), Selosol H-620, Polylon L-787 (All Product names, manufactured by CHUKYO YUSHI CO., LTD.), and the like are mentioned.

The volume average particle size of the wax particles is preferably 100 nm or more and 300 nm or lower and more preferably 150 nm or more and 250 nm or lower. When the volume average particle size of the wax particles is in the range mentioned above, there is a tendency such that the abrasion resistance of an image to be recorded becomes good. The volume average particle size of the wax particles can be measured by the same method as that for the resin particles.

In the ink jet recording ink according to this embodiment, the ratio (R1/R2) of the volume average particle size (R1) of the resin particles and the volume average particle size (R2) of the wax particles described above is 1.0 or lower. Due to the fact that the ratio (R1/R2) is 1.0 or lower, the wax particles are more likely to appear on the surface of an image than the resin particles. Thus, when an image is rubbed from the outside, the resin particles which contribute to the fixing of an image can be prevented from falling from the image, and therefore the abrasion resistance of the image can be improved.

The ratio (R1/R2) is 1.0 or lower and is preferably 0.5 or lower. Due to the fact that the ratio (R1/R2) is in the range mentioned above, the abrasion resistance of an image can be increased and also a reduction in the smoothness of the surface of the image can be suppressed.

The content of the wax particles is preferably 1% by mass or more and 3% by mass or lower in terms of the solid content based on the total mass of the ink. When the content of the wax particles is in the range mentioned above, there is a tendency such that the function of the wax particles is more favorably demonstrated and the discharge stability of the ink can be improved.

1.4. Compound A

The ink jet recording ink according to this embodiment preferably contains a compound (also referred to as "compound A") in which, after 2.0 grams of the compound is deposited in a laboratory dish that is 7.0 cm in diameter, the weight change of the compound when the compound is held in an equilibrium state at 25° C. (temperature) at 60% RH (humidity), and then left standing for 24 hours under the conditions of 25° C. and 70% RH and the conditions of 25° C. and 30% RH is in the range of ±10% and the remaining moisture amount when a 50% by mass aqueous solution thereof is left standing for 24 hours under the conditions of 30° C. and 35% RH is 10% or more. The ink jet recording ink according to this embodiment wherein, after 2.0 grams of the ink is deposited in a laboratory dish that is 7.0 cm in diameter, the weight change of the ink when the ink is held in an equilibrium state at 25° C. at 60% RH (humidity), and then left standing for 24 hours under the conditions of 25° C. and 70% RH, and the conditions of 25° C. and 30% RH is in the range of ±10%

The compound A has properties such that the moisture holding capacity is good and the moisture discharge hardly fluctuates. Thus, the evaporation of the moisture from the ink liquid surface of the ink containing vessel described later can be suppressed, and therefore the generation of an aggregate on the ink liquid surface can be suppressed.

Mentioned as the compound A are amphoteric ionic compounds and saccharides (e.g., glucose, mannose, fructose, ribose, xylose, arabinose, galactose, aldonic acid, sorbitol, maltose, cellobiose, lactose, sucrose, trehalose, maltotriose, and hydrogenated starch hydrolysate), sugar alcohols, hyaluronic acids, urea, and the like. The compounds A may be used singly or as a mixture of two or more kinds thereof.

Among the compounds mentioned above, the amphoteric ionic compound is preferably used. When the amphoteric ionic compound is used, the cationic group present in the amphoteric ionic compound is likely to be bonded to the anionic group of the self-dispersion pigment. Therefore, even when an aggregate originating from the resin is generated due to the evaporation of the moisture from the ink liquid surface of the ink containing vessel, the aggregate can be re-dispersed because the amphoteric ionic compound (compound A) is present between the self-dispersion pigment and the resin particles.

Specifically, as the amphoteric ionic compound, betaine compounds, amino acids, and derivatives thereof are mentioned. Mentioned as the betaine compounds are N-trialkyl substituted substances of amino acids, such as glycine betaine (referred to as "trimethylglycine"), γ-butyro betaine, homarine, trigonelline, β-alanine betaine, carnitine, atorinine, homoserine betaine, antopreurine, valine betaine, lysine betaine, ornithine betaine, alanine betaine, taurobetaine, stachydrine, glutamic-acid betaine, and phenylalanine betaine, and the like. Mentioned as the amino acids are glycine, alanine, serine, threonine, valine, methionine, cystein, proline, ricin, histidine, arginine, and derivatives thereof. Among the above, the betaine compounds are preferably used from the viewpoint that the function of re-dispersing an aggregate is better, and the glycine betaine is preferably used.

When the compound A is contained, the content is preferably 1% by mass or more and 10% by mass or lower and more preferably 3% by mass or more and 8% by mass or lower based on the total mass of the ink. Due to the fact that the content of the compound A is in the range mentioned above, there is a tendency such that the above-described function is further demonstrated and the re-dispersibility of an aggregate can be made good.

1.5. Other Components

The ink jetting ink according to this embodiment may contain components other than the components described above. Mentioned as such components are, for example, water, an organic solvent, a surfactant, an antiseptic/antifungal agent, a pH adjuster, a chelating agent, and the like.

Water

When the ink jetting ink according to this embodiment is an aqueous ink (ink containing 50% by mass or more of water), water is a component which serves as the main solvent of the ink and evaporations and scatters due to drying. Mentioned as water is, for example, one in which ionic impurities are removed as much as possible, such as pure water and ultrapure water, such as ion exchanged water, ultrafiltration water, reverse osmosis water, and distilled water. Moreover, when water which is sterilized by radiation of ultraviolet rays, addition of hydrogen peroxide, and the like is used, the generation of mold or bacteria can be prevented when storing the ink over a long period of time.

Organic Solvent

As the organic solvent, 1,2-alkanediols, glycol ethers, polyhydric alcohols, pyrolidone derivatives, and the like are mentioned. The organic solvents may be used singly or as a mixture of two or more kinds thereof.

As the 1,2-alkanediols, 1,2-propanediol, 1,2-butanediol, 1,2-pentanediol, 1,2-hexanediol, 1,2-octanediol, and the like are mentioned, for example. Since the 1,2-alkanediols have good function of increasing the wettability of the ink to a recording medium for uniformly wetting, a good image can be formed on the recording medium. When the 1,2-alkanediols are contained, the content is preferably 1% by mass or more and 20% by mass or lower based on the total mass of an ink for background.

Mentioned as the polyhydric alcohols are, for example, ethylene glycol, diethylene glycol, triethylene glycol, propylene glycol, dipropylene glycol, 1,3-propanediol, 1,3-butanediol, 1,3-pentanediol, 1,4-butanediol, 1,5-pentanediol, 1,6-hexanediol, 2,3-butanediol, 3-methyl-1,3-butanediol, 3-methyl-1,5-pentanediol, 2-methyl-1,3-propanediol, 2,2-dimethyl-1,3-propanediol, 2-methyl-2,4-pentanediol, trimethylol propane, glycerin, and the like. The polyhydric alcohols can be preferably used from the viewpoint that drying and solidification of the ink on the nozzle surface of the head is suppressed, and clogging, poor discharge, and the like can be reduced. When the polyhydric alcohols are contained, the content is preferably 2% by mass or more and 20% by mass or lower based on the total mass of the ink for background.

Mentioned as the glycol ethers are, for example, alkylene glycol monoether, alkylene glycol diether, and the like.

Mentioned as the alkylene glycol monoether are, for example, ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol monohexyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monoethyl ether, dipropylene glycol monomethyl ether, dipropylene glycol monoethyl ether, and the like are mentioned.

Mentioned as the alkylene glycol diether are, for example, ethylene glycol dimethyl ether, ethylene glycol diethyl ether, ethylene glycol dibutyl ether, diethylene glycol dimethyl ether, diethylene glycol diethyl ether, diethylene glycol ethyl methyl ether, diethylene glycol dibutyl ether, triethylene glycol dimethyl ether, triethylene glycol diethyl ether, triethylene glycol dibutyl ether, triethylene glycol butyl methyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and the like.

The glycol ethers can be used singly or as a mixture of two or more kinds thereof. The glycol ethers can control the wettability and the permeation speed of the ink to a recording medium. Therefore, a clear image with little density unevenness can be recorded. When the glycol ethers are contained, the content is preferably 0.05% by mass or more and 6% by mass or lower based on the total mass of the ink from the viewpoint of improving the wettability and the permeability to a recording medium to thereby reduce density unevenness, improving the storage stability and the discharge reliability of the ink, and the like.

Mentioned as the pyrolidone derivative are, for example, N-methyl-2-pyrolidone, N-ethyl-2-pyrolidone, N-vinyl-2-pyrolidone, 2-pyrolidone, N-butyl-2-pyrolidone, 5-methyl-2-pyrolidone, and the like. These substances can be used singly or as a mixture of two or more kinds thereof. When the pyrolidone derivatives are contained, the content is preferably 0.5% by mass or more and 5% by mass or lower based on the total mass of the ink.

Surfactant

The surfactant has a function of reducing the surface tension, and increasing the wettability with a recording medium. Among surfactants, acetylene glycol surfactants, silicone surfactants, and fluorochemical surfactants can be preferably used, for example.

The acetylene glycol surfactants include, but not particularly limited thereto, Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (All Product names, manufactured by Air Products and Chemicals. Inc.), Olfine B, Y, P, A, STG, SPC, E1004, E1010, PD-001, PD-002W, PD-003, PD-004, EXP.4001, EXP.4036, EXP.4051, AF-103, AF-104, AK-02, SK-14, and AE-3 (All Product names, manufactured by Nisshin Chemical Co., Ltd.), and Acetylenol E00, E00P, E40, and E100 (All Product names, manufactured by Kawaken Fine Chemicals Co., Ltd.), for example.

The silicone surfactants are not particularly limited and polysiloxane compounds are preferably mentioned. The polysiloxane compounds include, but not particularly limited, polyether modified organosiloxane, for example. Mentioned as commercially-available items of the polyether modified organosiloxane are, for example, BYK-306, BYK-307, BYK-333, BYK-341, BYK-345, BYK-346, and BYK-348 (All Product names, manufactured by BYK), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (All Product names, manufactured by Shin-Etsu Chemical Co., Ltd.).

As the fluorochemical surfactants, fluoride modified polymer is preferably used, and BYK-340 (manufactured by BYK Chemie Japan) is mentioned as a specific example.

Antiseptic/Antifungal Agent

Mentioned as the antiseptic/antifungal agent, sodium benzoate, sodium pentachlorophenol, sodium 2-pyridinethiol-1-oxide, sodium sorbate, sodium dehydroacetate, 1,2-dibenzinethiazoline-3-on (Proxel CRL, Proxel BND, Proxel GXL, Proxel XL-2, and Proxel TN of ICI) and the like.

PH Adjuster

Mentioned as the pH adjuster are, for example potassium dihydrogen phosphate, disodium hydrogenphosphate, sodium hydroxide, lithium hydroxide, potassium hydroxide, ammonia, diethanolamine, triethanolamine, triisopropanolamine, potassium carbonate, sodium carbonate, sodium hydrogencarbonate, and the like.

Chelating Agent

As the chelating agent, ethylenediamine tetraacetic acid, salts thereof (disodium hydrogen ethylenediaminetetraacetate and the like), and the like are mentioned, for example.

1.6. Preparation Method of Ink

The ink jet recording ink according to this embodiment is obtained by mixing the components mentioned above in an arbitrary order, and then performing filtration and the like as required to remove impurities. A mixing method of the components, a method of successively adding materials in a container having a stirring device, such as a mechanical stirrer and a magnetic stirrer, and then mixing and stirring the materials is suitably used. As the filtration method, centrifugal filtration, filter filtration, and the like can be performed as required.

1.7. Physical Properties of Ink

In the ink jet recording ink according to this embodiment, the surface tension at 20° C. is preferably 20 mN/m or more and 50 mN/m or lower and more preferably 25 mN/m or more and 40 mN/m or lower from the viewpoint of the balance between the image quality and the reliability as the ink jet recording ink. The measurement of the surface tension can be achieved by, for example, determining the surface tension when a platinum plate is wetted with the ink in a 20° C. environment using an automatic surface tension meter CBVP-Z (Product name, manufactured by Kyowa Interface Science Co., LTD.).

From the same viewpoint, the viscosity at 20° C. of the ink jet recording ink according to this embodiment is preferably 2 mPa·s or more and 15 mPa·s or lower and more preferably 2 mPa·s or more and 10 mPa·s or lower. The measurement of the viscosity can be achieved by measuring the viscosity in a 20° C. environment using a viscoelasticity tester MCR-300 (Product name, manufactured by Pysica), for example.

2. Ink Jet Recording System

An ink jet recording system according to one embodiment of the invention contains an ink containing vessel containing the ink jet recording ink described above and an ink jet recording head which discharges the ink supplied from the ink containing vessel, in which the ink containing vessel has an ink containing chamber containing the ink and an air introduction flow path which introduces air into the ink containing chamber through the ink contained in the ink containing chamber.

Since the ink jet recording system according to this embodiment employs the ink jet recording ink described above, an aggregate is hard to be generated on the ink liquid surface (gas-liquid interface) of the ink containing vessel, and even when an aggregate is generated, good ink discharge stability is achieved because the re-dispersibility is good. Since the ink jet recording system according to this embodiment employs the ink jet recording ink described above, an image having good abrasion resistance (fixability) can be recorded.

The ink jet recording system according to this embodiment can be enforced using an ink jet recording device (hereinafter also simply referred to as a "recording device" or a "printer"). Specifically, the recording device has the ink jet recording system described above, and performs recording by discharging the ink, which is supplied to the head from the ink containing vessel, to a recording medium from the head.

Hereinafter, the ink jet recording system of this embodiment is described with reference to a case where the ink jet recording system is applied to the ink jet recording device as an example.

2.1. Ink Jet Recording Device

The recording device having the ink jet recording system can be classified into some types according to a system of a recording device and an ink supplying system. As a type of the system of the recording device, a line printer and a serial printer are mentioned, for example. When briefly described, the line printer has a line head with a length equivalent to the width of a recording medium, in which a head is not (almost) moved and fixed, and printing is performed by one pass (single pass). On the other hand, a serial printer usually performs printing by two passes or more (multipass) while moving a head back and forth (shuttle movement) in a direction orthogonal to a transporting direction of a target recording medium. As the ink supplying system, an on-carriage type serial printer and an off-carriage type serial printer are mentioned, for example.

In the following description, the ink jet recording system and a recording device having the same are described taking the off-carriage type serial printer of the types mentioned above as an example with reference to the drawings. Herein, the off-carriage type serial printer is one in which the ink containing vessel, such as an ink tank and an ink cartridge, and a head of the carriage are connected with an ink supply path, such as a tube.

In each drawing used for the following description, the scale is changed as appropriate in each constituent element so that each constituent element (member) has a size with which the constituent elements can be recognized on the drawings. This embodiment is not limited only to the number, the shape, and the size ratio of the constituent elements and the relative positional relationship of the constituent elements illustrated in these drawings.

2.1.1. Configuration of Recording Device

Figure 1:
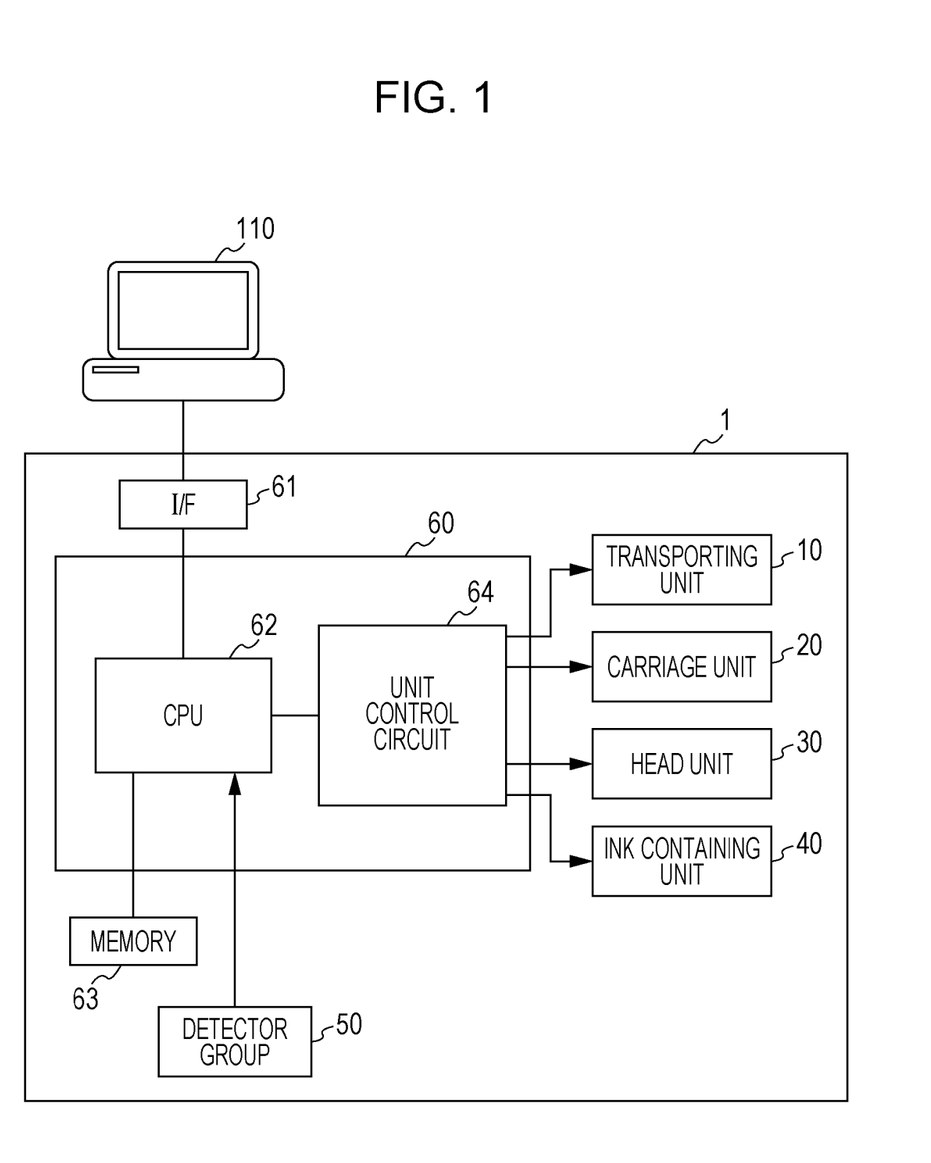
FIG. 1 is a block diagram illustrating the entire configuration of a printer having an ink supply system.
Figure 2:
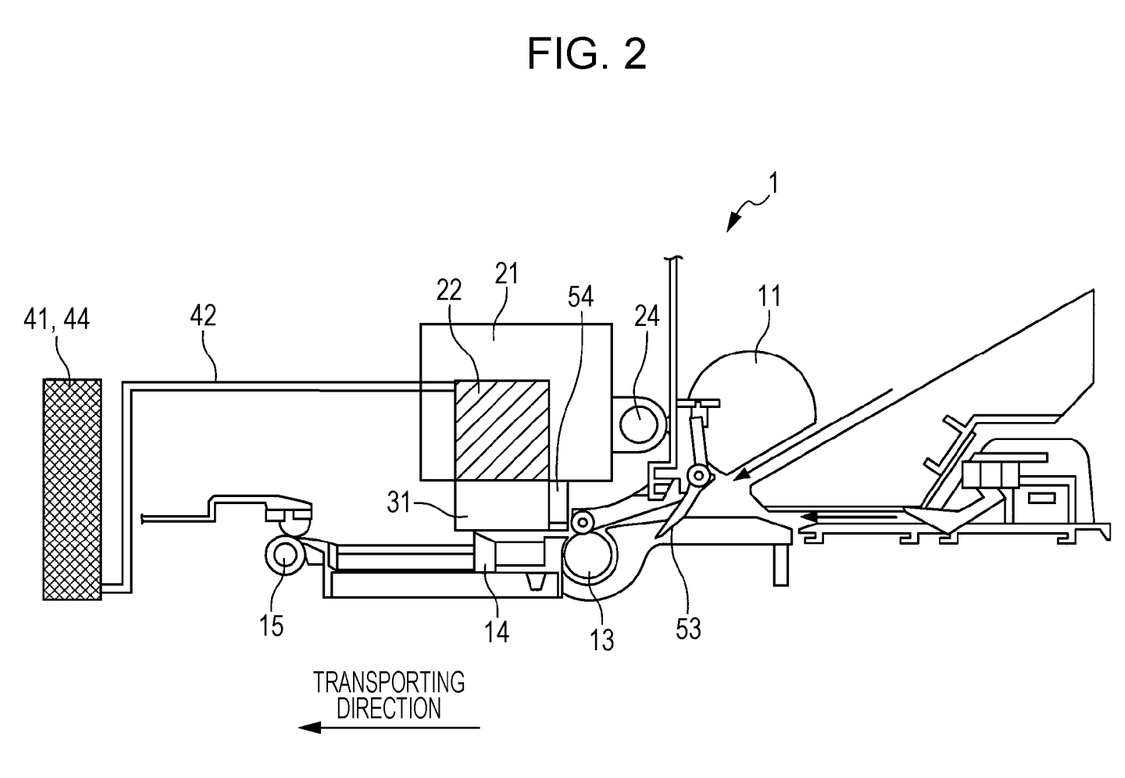
FIG. 2 is a schematic view illustrating a horizontal cross section of the printer having the ink supply system.

FIG. 1 is a block diagram illustrating the configuration of a printer 1 having the ink jet recording system. FIG. 2 is a schematic view illustrating the horizontal cross section of the printer 1 having the ink jet recording system.

The printer 1 of this embodiment is a device of discharging ink to a recording medium, such as paper, and forming an image on the surface to be recorded of the recording medium.

The printer 1 has a transporting unit 10, a carriage unit 20, a head unit 30, an ink containing unit 40, a detector group 50, and a controller 60. The printer 1 which receives print data from a computer 110 which is an external device controls each unit (the transporting unit 10, the carriage unit 20, the head unit 30, the ink containing unit 40) by the controller 60.

The controller 60 controls each unit based on the print data received from the computer 110, and prints an image on a recording medium. The state in the printer 1 is observed by the detector group 50, and the detector group 50 outputs the detection results to the controller 60. The controller 60 controls each unit based on the detection results output from the detector group 50.

The transporting unit 10 is one for transporting a recording medium in a predetermined direction (hereinafter referred to as a "transporting direction" or "subscanning direction"). The transporting unit 10 has a paper feed roller 11, a transporting motor (not illustrated), a transporting roller 13, a platen 14, and a paper discharging roller 15. The paper feed roller 11 is a roller for feeding paper to a recording medium inserted into a paper inserting port in the printer 1. The transporting roller 13 is a roller for transporting the recording medium fed by the paper feed roller 11 to a region where printing can be performed, and is driven by a transporting motor. The platen 14 supports the recording medium under printing. The paper discharging roller 15 is a roller for discharging the recording medium to the outside of the printer 1, and is provided at the downstream side in the transporting direction to the region where printing can be performed.

The carriage unit 20 is a movement mechanism for moving, i.e., scanning, a head 31 in a direction crossing the transporting direction (the subscanning direction) (hereinafter referred to as a "movement direction" or a "main scanning direction") while discharging ink to the recording medium which is made to stand still in a recording region. The carriage unit 20 has a carriage 21, a carriage motor (not illustrated), and a subtank (sub-ink tank) 22. The carriage 21 is one which has the subtank 22 and the head 31 and is connected to the carriage motor (not illustrated) through a timing belt (not illustrated). The carriage 21 moves back and forth along a guide shaft 24 by the carriage motor in a state where the carriage 21 is supported by the guide shaft 24 crossing the transporting direction described later. The guide shaft 24 is supported in such a manner that the carriage 21 can move back and forth in the axis line direction of the guide shaft 24. The subtank 22 is one for suppressing a pressure fluctuation of the ink in the head 31 which may be caused due to the back and forth movement of the carriage 21.

Although not illustrated, the subtank 22 may have four subtanks, for example, and may contain ink different in the color in each subtank.

The carriage unit 20 may not have the subtank 22. In this case, the ink containing vessel 41 and the head 31 are connected through an ink supply path 42. The subtank 22 is described in more detail in FIG. 3 described later. When using the on-carriage type serial printer, an ink cartridge may be used in place of the subtank 22.

The head unit 30 is one for discharging ink to a recording medium. The head unit 30 has the head 31 having a plurality of nozzles. The head 31 is provided on the carriage 21. Therefore, when the carriage 21 moves in the movement direction, the head 31 also moves in the movement direction. Then, the head 31 discharges ink while moving in the movement direction, whereby an image is formed on the surface to be recorded of the recording medium.

Although not illustrated, the four heads 31 may discharge ink corresponding to the color of ink containing in each of the four subtanks 22, for example.

Figure 3:
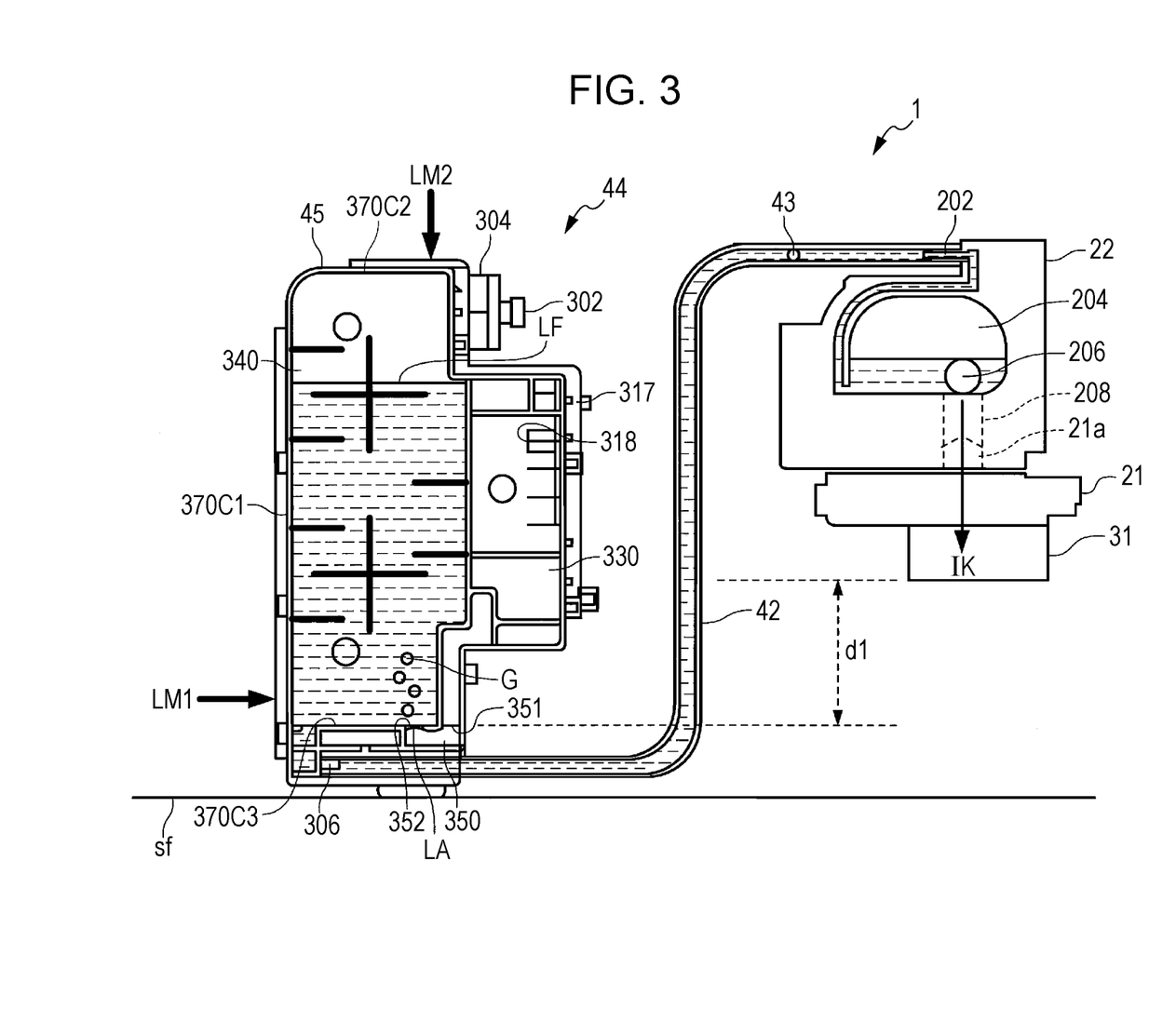
FIG. 3 is a schematic view explaining the principle of the ink supply from an ink tank which is an example of an ink containing vessel to a head.

The ink containing unit 40 is one which contains ink and also supplies the contained ink to the head 31 through the ink supply path. The ink containing unit 40 has an ink containing vessel 41, the ink supply path 42, and a filter 43 (FIG. 3).

The ink containing vessel 41 is one disposed at a place different from the place of the carriage 21 and is stored in an ink containing vessel storage portion (not illustrated) provided at the outside of the main body of the printer 1 (outside of the movement range of the carriage 21). The ink containing vessel 41 and the head 31 (carriage 21) are connected by the ink supply path 42. In this case, the ink containing vessel 41 does not move.

The ink containing vessel 41 has a structure such that the atmosphere and ink can contact each other. More specifically, the ink jet recording system of the embodiment described above allows the ink contained in the ink containing vessel 41 to contain air bubbles. Therefore, according to the ink jet recording system and the recording device of this embodiment having the ink jet recording system, an ink with a large nitrogen dissolved amount containing air bubbles can be contained in the ink containing vessel 41 irrespective of whether or not degassing treatment is performed. Furthermore, the ink containing vessel 41 facilitates a further supply (refilling) of ink. Such an ink containing vessel 41 is not particularly limited insofar as known ink can be contained, and, for example, a large-capacity ink tank and an open type ink cartridge are mentioned.

Although not illustrated, the four ink containing vessels 41 may contain the ink corresponding to the color contained in each of the four subtanks 22. Each ink containing vessel 41 can confirm the ink liquid surface from the outside from a predetermined portion. The ink containing vessel 41 is one constituent element of the printer 1 but the spatial restriction is smaller because the ink containing vessel 41 is provided at the outside of the main body of the printer 1. Therefore, the ink containing vessel 41 can contain a larger amount of ink than the subtank 22.

The ink supply path 42 is an ink flow path for connecting the ink containing vessel 41 and the head 31 and supplying the ink in the ink containing vessel 41 to the head 31. The ink supply path 42 can connect the ink containing vessel 41 capable of containing ink different in color and the subtank 22 for containing the ink of the corresponding color. The ink supply path 42 can be formed with a member having flexibility, such as synthetic rubber, and can be a hose or a tube. When the ink is discharged from the head 31 and the ink in the subtank 22 is consumed, the ink in the ink containing vessel 41 is supplied to the subtank 22 through the ink supply path 42. Thus, the printer 1 can continuously perform printing without an interruption over a long period of time.

The ink containing vessel 41 and the ink supply path 42 are described in more detail in FIG. 3 described later.

The filter 43 is provided in the flow path of the ink supply path 42. When the ink flowing through the ink supply path 42 contains air bubbles, the filter 43 can prevent the inflow of the air bubbles into the head by catching the air bubbles. Thus, both filling the head 31 with the ink and the discharging of the ink from the head 31 are good and both initial filling properties and continuous printing stability are good.

The position where the filter 43 is placed is not particularly limited. For example, the filter 43 may be provided near an outlet port of the ink containing vessel 41 (liquid lead portion 306).

The detector group 50 contains a linear encoder (not illustrated), a rotary encoder (not illustrated), a paper detection sensor 53, an optical sensor 54, and the like. The linear encoder detects the position of the movement direction of the carriage 21. The rotary encoder detects the rotation amount of the transporting roller 13. The paper detection sensor 53 detects the position of the top end of a recording medium, such as paper, under feeding. The optical sensor 54 detects the absence or presence of a target recording medium by a light emitting portion and a light receiving portion attached to the carriage 21. Then, the optical sensor 54 can detect the position of the end of the recording medium while moving by the carriage 21, and can detect the width of the target recording medium. The optical sensor 54 can also detect the top end (which is an end at the downstream side in the transporting direction and is also referred to as an "upper end") and the back end (which is an end at the upstream side in the transporting direction and is also referred to as a "lower end") of the target recording medium according to a situation.

The controller 60 is a control unit (control portion) for controlling the printer 1. The controller 60 has an interface portion 61, a CPU 62, a memory 63, and a unit control circuit 64. The interface portion 61 transmits and receives data between the computer 110 which is an external device and the printer 1. The CPU 62 is an arithmetic processing unit for controlling the entire printer 1. The memory 63 is one for securing a space for storing the program of the CPU 62, a working space, and the like and has storage elements, such as RAM and EEPROM. The CPU 62 controls each unit through the unit control circuit 64 according to the program stored in the memory 63.

When performing recording, a dot formation operation of discharging the ink from the head 31 while moving in the movement direction and a transporting operation of transporting a recording medium in the transporting direction are alternately repeated by the control of the controller 60 described later, and then an image constituted by a plurality of dots can be printed on the target recording medium.

Thus, the ink jet recording device of this embodiment having the ink jet recording system described above forms an image in a region facing the head 31 of the recording medium.

2.1.2. Operation of Recording Device

Mentioned as the operation of the recording device of this embodiment are a recording operation of attaching ink to a recording medium and forming an image and a transporting operation of transporting a recording medium. The recording device of this embodiment performs recording by alternately performing the recording operation and the transporting operation. In recording, the recording medium is not transported and is held by the platen 14 positioned in the recording region. The recording operation includes, but not limited to the following operation, an ink supply operation of supplying ink from the ink containing vessel 41 to the head 31, an air introduction operation of introducing the atmosphere (air) into the ink containing vessel 41 for the purpose of stably supplying the ink to the head 31 from the ink tank 44, and a discharge operation of discharging the ink to a recording medium from the head 31, for example. A desired image can be formed in the region facing the head 31 in the recording medium by such operations of the recording device.

The ink supply operation described above includes an operation of further supplying (refilling) ink corresponding to the ink which is supplied and reduced to the ink containing vessel 41. The operation of the recording device of this embodiment can be referred to as an ink jet recording method utilizing the ink supply system. Each operation included in the operation of the recording device described above can be referred to as a "process".

Hereinafter, the recording medium for use in the recording operation in this embodiment is described, and subsequently an example of the recording operation is described.

Recording Medium

The recording medium is not particularly limited and includes an ink-absorbing recording medium, for example. The ink-absorbing recording medium is not particularly limited, and, for example, includes regular paper, such as an electronic photograph paper with high permeability of an aqueous ink, an ink jet paper (a paper exclusive for ink jet having an ink absorbing layer constituted by silica particles and alumina particles or an ink absorbing layer constituted by a hydrophilic polymer, such as polyvinyl alcohol (PVA) and polyvinyl pyrolidone (PVP)), an art paper, a coated paper, a cast paper, and the like which have relatively low permeability of an aqueous ink and are used for general offset printing.

Ink Supply Operation

The recording operation in this embodiment includes an ink supply operation. The ink supply operation is one for supplying ink from the ink containing vessel 41 to the head 31, and can employ the ink supply system of this embodiment. The ink supply operation is described in detail later.

Air Introduction Operation

The recording operation in this embodiment may further include an air introduction operation. The air introduction operation assists the ink supply operation, and can utilize the ink supply system of this embodiment. For example, in the recording operation utilizing the ink supply system provided with the ink containing vessel having the air introduction flow path for introducing air and having the structure of generating air bubbles in the ink as described above, the air introduction operation is performed. The air introduction operation introduces the atmosphere (air) into the ink containing vessel 41 for the purpose of stably supplying the ink to the head 31 from the ink tank 44. The air introduction operation is described in detail later.

Discharge Operation

The recording operation in this embodiment includes a discharge operation. The discharge operation is one for discharging ink liquid droplets onto a recording medium by an ink jet recording method, and forming an image. As the discharging method, known methods can be used. In particular, when a method of discharging liquid droplets from nozzles utilizing vibration of a piezoelectric element (recording method using a head of forming ink droplets by mechanical deformation of an electrostriction element) or a method of generating air bubbles in a head using a heating element and discharging ink from nozzles is used, good recording can be performed. Various discharging conditions, such as the temperature and the time of the discharging and the viscosity of the ink to be discharged are not particularly limited.

Hereinafter, the ink supply operation and the air introduction operation among the recording operations in this embodiment are mainly described in detail.

FIG. 3 is a schematic view explaining the principle of the ink supply from the ink tank 44 which is an example of the ink containing vessel 41 to the head 31. A technique of the ink supply illustrated in FIG. 3 is one utilizing the principle of the Mariotte's bottle when briefly described and is one in which the head 31 and the ink tank 44 are connected through the subtank 22 and the ink supply path 42 provided in the carriage 21 and the ink is sucked from the ink tank 44 and supplied to the head 31 by generating a negative pressure in the subtank 22. FIG. 3 mainly schematically illustrates the inside of the ink tank 44, the ink supply path 42, and the subtank 22.

The printer 1 is placed on a predetermined horizontal surface sf. A liquid lead portion 306 of the ink tank 44 and a liquid receiving portion 202 of the subtank 22 are connected through the ink supply path 42.

The subtank 22 is formed with a synthetic resin, such as polystyrene and polyethylene. The subtank 22 has an ink storage chamber 204, an ink flowing path 208, and a filter 206. Into the ink flowing path 208, an ink supply needle 21a of the carriage 21 is inserted. When impurities, such as foreign substances, are mixed in the ink flowing through the ink flowing path 206, the filter 206 prevents the inflow of the impurities into the head 31 by catching the impurities. The ink of the ink storage chamber 204 flows through the ink flowing path 208 and the ink supply needle 21a by the suction from the head 31, and then supplied to the head 31. The ink supplied to the head 31 is discharged to a recording medium through nozzles, and then attached thereto, thereby forming an image (the discharge operation described above).

Herein, also in the case where the subtank 22 is provided between the ink containing vessel 41 and the head 31 as in this embodiment, the ink supply path 42 is one for connecting the ink containing vessel 41 and the head 31, and therefore the ink supply path 42 is present also in the subtank 22. Therefore, in the case described above, both the filter 43 and the filter 206 are equivalent to a filter to be provided in the ink supply path 42.

The ink tank 44 is one for supplying an ink to the head 31 of the printer 1 utilizing the principle of the Mariotte's bottle. The external surface of the ink tank 44 contains a first wall 370C1, a second wall (upper surface wall) 370C2, and a bottom surface wall 370C3. The ink tank 44 has an air introduction flow path and an ink flow path therein. The air introduction flow path is a flow path for introducing air from an atmosphere opening port 317 to the ink containing chamber 340 passing through an atmosphere introduction port 318 via an atmosphere flow path which is not illustrated. The ink flow path is a flow path for performing injection (including "refilling", which applies to the following description) of the ink from a liquid injection path 304 to the liquid lead portion 306 passing through the ink containing chamber 340.

First, the air introduction flow path is a flow path to be used in the air introduction operation. The air introduction flow path is constituted by the atmosphere opening port 317 which opens to the outside (atmosphere), the air containing chamber 330 in which the atmosphere introduction port 318 serves as one end and an air chamber side opening 351 serves as the other end, and a liquid chamber communication path 350 in which the air chamber side opening 351 serves as one end and the air introduction port 352 serves as the other end. The atmosphere opening port 317 communicates with the atmosphere. The air containing chamber 330 opens in the atmosphere introduction port 318 serving as one end. The atmosphere opening port 317 and the atmosphere introduction port 318 communicate with each other through a flow path which is not illustrated. More specifically, the air containing chamber 330 communicates with the outside (atmosphere). In the liquid chamber communication path 350, the air chamber side opening 351 serving as one end opens in the air containing chamber 330 and the air introduction port 352 serving as the other end opens in the ink containing chamber 340. More specifically, the air containing chamber 330 communicates with the ink containing chamber 340. The flow path cross-sectional area of the liquid chamber communication path 350 is preferably small such that a meniscus (liquid surface crosslinking) can be formed.

Thus, in the air introduction flow path described above, the air introduction port 352 serving as one end opens in the ink containing chamber 340 and the atmosphere opening port 317 serving as the other end opens to the outside. More specifically, in the use state of the ink tank 44 described later, a liquid surface directly contacting the atmosphere is formed in the liquid chamber communication path 350 (in detail, near the air introduction port 352), and, by introducing air (air bubbles) into the ink in the ink containing chamber 340 from the air introduction port 352, air (air bubbles G) is introduced into the ink containing chamber 340. In other words, air is introduced into the ink containing chamber 340 through the ink from the air introduction flow path. Thus, the ink can be stably supplied from the ink tank 44 to the head 31 as described later. More specifically, the air introduction operation described so far is performed for the purpose of stabilizing the ink supply operation described later.

On the other hand, the ink flow path described above is used in the ink supply operation described above. These ink supply operations are performed with a reduction in the ink storage amount of the ink tank 44 resulting from the discharge operation from the head 31 and are stably performed by the air introduction operation.

Herein, the ink tank 44 has a use state and an injection state. The "use state" refers to a state of the ink tank 44 placed on the horizontal surface when supplying the ink to the head 31 of the printer 1. In other words, in the use state, the liquid injection path 304 opens in a horizontal direction (The opening is closed by a plug member 302). FIG. 3 illustrates the ink tank 44 in the use state. In the use state, the ink containing chamber 340 and the air containing chamber 330 are horizontally positioned in a line. In the use state, the air introduction port 352 is positioned below relative to the surface of the liquid contained in the ink containing chamber 340. On the other hand, the "injection state" refers to a state of the ink tank 44 placed on the horizontal surface when the ink is injected into the ink tank 44. In other words, in the injection state, the liquid injection path 304 opens upward. In the injection state, the ink containing chamber 340 and the air containing chamber 330 are positioned in a line in a perpendicular direction. In the injection state, the air introduction port 352 is positioned above relative to the liquid surface of the liquid contained in the ink containing chamber 340 in a case where the liquid with a liquid amount when the liquid surface of the liquid contained in the ink containing chamber 340 in the use state is located on a straight line LM1 ("First state display line LM1") is contained in the ink containing chamber 340.

In the injection state described above, a user may stop the refilling with the ink when the ink liquid surface reaches near a straight line LM2 ("Second state display line LM2") which becomes horizontal in the injection state. Thus, after the ink is injected into the ink containing chamber 340 from the liquid injection path 304, the liquid injection path 304 is sealed by the plug member 302. Furthermore, the ink containing chamber 340 is maintained at a negative pressure by sucking the ink in the ink containing chamber 340 from the head 31.

In the use state described above, the air introduction port 352 is positioned below relative to the first state display line LM1. In FIG. 3, the air introduction port 352 is formed on the bottom surface wall 370C3 positioned at a lower side across the ink containing chamber 340 in the use state of the main body 45 of the container which defines and forms the ink containing chamber 340. Thus, even when the ink in the ink containing chamber 340 is consumed and the liquid surface of the ink containing chamber 340 is lowered, a liquid surface (atmosphere contact surface) LA contacting the atmosphere is maintained at a fixed height over a long period of time (time in which the ink liquid surface reaches the first state display line LM1). In the use state, the air introduction port 352 is disposed to be lower than the head 31. Thus, a hydraulic head difference d1 arises. In the use state, the hydraulic head difference d1 in a state where the atmosphere contact surface LA which is a meniscus is formed near the atmosphere introduction port 352 of the liquid chamber communication path 350 is also referred to as a "stationary hydraulic head difference d1" in the following description.

Due to the fact that the ink in the ink storage chamber 204 is sucked by the head 31, the pressure of the ink storage chamber 204 becomes a predetermined negative pressure or higher. When the pressure of the ink storage chamber 204 becomes a predetermined negative pressure or higher, the ink in the liquid containing chamber 340 is supplied to the ink storage chamber 204 via the ink supply path 42. More specifically, the amount of the ink equivalent to the amount of the ink flowing to the head 31 is automatically further supplied (refilled) to the ink storage chamber 204 from the liquid containing chamber 340. In other words, the ink is supplied from the liquid containing chamber 340 to the ink storage chamber 204 due to the fact that the suction force (negative pressure) from the head 31 side becomes larger by a certain amount than the hydraulic head pressure d1 caused by a height difference in the perpendicular direction between the air containing chamber 330 in the ink tank 44, i.e., the atmosphere contact surface (ink liquid surface) LA contacting the atmosphere, and the nozzle surface of the head 31.

Herein, in the ink jet recording system according to this embodiment, when the liquid surface (ink liquid surface LF of FIG. 3) of the ink contained in the ink containing chamber is sufficiently large, the ink discharge stability may not be sufficiently obtained. For example, a case where a ratio (A/B) of the area (A) of the horizontal cross section inside the ink containing chamber 340 in the use state described above and the area (B) of the cross section of the ink supply path 42 which supplies ink to the head 31 is 300 or more is mentioned. Even in such a case, when the ink jet recording ink described above is used, the generation of an aggregate can be suppressed, and even when an aggregate is generated, the aggregate can be easily re-dispersed. The ink discharge stability becomes more difficult to obtain as an increase in the ratio (A/B). This is because even when an aggregate is generated at a fixed ratio, the amount of foreign substance to be generated becomes larger as an increase in the area (A).

The use aspect of the ink tank also affects the generation of the foreign substances. For example, in the ink tank having the injection state described above, when a ratio (C/B) of the area (C) of the horizontal cross section inside the ink containing chamber 340 in the injection state and the area (B) of the cross section of the ink supply path 42 which supplies ink to the head 31 is large, discharge stability may not be sufficiently obtained for the same reason as above. As such an ink jet recording system, the ratio (C/B) is 900 or more, for example. Even in such a case, sufficient discharge stability can be obtained in a case of the ink jet recording ink according to the invention. Therefore, even when an ink tank in which the ratio (C/B) becomes 900 or more is used, sufficient discharge stability can be obtained.

In the ink tank having the injection state and the use state described above, when an area ratio (C/A) of the area (A) and the area (C) is 2.5 or more, the ink tank in the injection state becomes difficult to fall, and a user can stably inject the ink. Furthermore, since the area of the place where the ink tank is placed in the use state can be made small, the ink tank can be placed also in a narrow space. Even in an ink jet recording system having the ink tank in which the area ratio (C/A) becomes 2.5 or more, sufficient discharge stability can be obtained in a case of the ink jet recording ink according to the invention.

The horizontal cross section inside the ink containing chamber 340 refers to one having the largest area among the horizontal cross sections inside the ink containing chamber 340. The cross section of the ink supply path 42 refers to one having the largest area among the cross sections of the ink supply path 42 orthogonal to the flowing direction of the ink passing through the ink supply path.

When the ink in the ink containing chamber 340 is consumed, the air of the air containing chamber 330 is introduced as the air bubbles G into the ink containing chamber 340 through the liquid chamber communication path 350. More specifically, in the ink containing chamber 340 of the ink tank 44, the atmosphere introduced through the air introduction flow path contacts the ink injected through the ink flow path. Thus, the ink liquid surface LF of the ink containing chamber 340 is lowered. On the other hand, since the height of the atmosphere contact surface LA contacting the atmosphere is maintained at a fixed height, the hydraulic head difference d1 is maintained at a fixed difference. More specifically, by the predetermined suction force of the head 31, the ink can be stably supplied to the head 31 from the ink tank 44 in terms of the ink amount.

3. Examples

Hereinafter, the invention is more specifically described with reference to Examples and Comparative Examples but the invention is not limited to these Examples.

3.1. Preparation of Ink

Components were mixed and stirred with the compounding amount shown in Tables 1 and 2, and then filtered under pressure with a membrane filter with a pore size of 10 μm, thereby obtaining ink according to each of Examples and each of Comparative Examples. The units indicated in Tables 1 and 2 are % by mass. With respect to pigments, dispersion resin, resin particles, and wax particles, values in terms of the solid content are indicated.

Among the components used in the table, the components indicated by the abbreviated name or the product name are as follows.

- Pigment 1 (Product name "CAB-O-JET 260M", manufactured by Cabot Corp., C.I. pigment red 122, self-dispersion pigment)
- Pigment 2 (Product name "CAB-O-JET 250C", manufactured by Cabot Corp., C.I. pigment blue 15:3, self-dispersion pigment)
- Pigment 3 (C.I. pigment red 122, manufactured by Clariant)
- Styrene acrylic resin (Weight average molecular weight of 16500, Acid value of 240, Tg: 100° C.)
- Superflex 460 (Product name, manufactured by Dai-Ichi Kogyo Seiyaku Co., Ltd., Tg: −21° C., Particle size: 30 nm, urethane resin)
- Superflex 470 (Product name, manufactured by Dai-Ichi Kogyo Seiyaku Co., Ltd., Tg: −31° C., Particles size: 50 nm, urethane resin)
- Superfex 740 (Product name, manufactured by Dai-Ichi Kogyo Seiyaku Co., Ltd., Tg: −34° C., Particle size: 200 nm, urethane resin)
- Mowinyl 8020 (Product name, manufactured by Nippon Synthetic Chemical Industry Co., Ltd., Tg: −20° C., Particle size: 100 nm, acrylic resin)
- Mowinyl 727 (Product name, manufactured by Nippon Synthetic Chemical Industry Co., Ltd., Tg: 5° C., Particle size: 60 nm, acrylic resin)
- Mowinyl 8010 (Product name, manufactured by Nippon Synthetic Chemical Industry Co., Ltd., Tg: 19° C., Particle size: 80 nm, acrylic resin)
- Selosol H-620 (Product name, manufactured by CHUKYO YUSHI CO., LTD., Specific gravity: 0.90, Particle size: 200 nm, paraffin wax)
- Polylon L-787 (Product name, manufactured by CHUKYO YUSHI CO., LTD., Specific gravity: 0.95, Particle size: 100 nm, polyethylene wax)

3.2. Evaluation Test

Generation of Foreign Substances 20 g of each ink obtained as described above was put into a 50 ml glass bottle, and then, 3 g of a solvent contained in each ink was evaporated in a 60° C. thermostat in a state where a lid was open. Thereafter, the lid of the glass bottle was closed, the glass bottle was lightly stirred, and then the ink in the glass bottle was filtered with a filter with a pore size of 10 μm. At this time, it was confirmed whether or not foreign substances other than environmental foreign substance (keratin components and wastes mixed by an ink manufacturing process and the like) were collected by filtration. More specifically, the foreign substances clearly generated by the external factor were not taken into consideration and the absence or presence of foreign substances originating from the ink components was judged. The evaluation criteria are as follows and the evaluation results are shown in Tables 1 and 2.

○: Foreign substances other than environmental foreign substances were not confirmed.

×: Foreign substances other than environmental foreign substances were confirmed.

Continuous Printing Stability

Each ink obtained as described above was charged into an ink tank of an ink jet printer L100 (Product name, manufactured by Seiko Epson Corp.), and then it was confirmed that the ink was able to be discharged from all nozzles of a head. Thereafter, images with Duty of 70% were recorded using each ink and a A4 size regular paper (Product name "P paper", manufactured by Fuji Xerox, Co., Ltd.). The images were recorded under the conditions of continuously 500 sheets per day, and 1000 sheets in total. The recording condition was a print resolution of 720×720 dpi.

In the ink jet printer L100, the area (A) of the horizontal cross section inside a portion equivalent to the ink containing chamber in the use state was 960 mm². For an ink supply path which supplies the ink to a head, an elastomer tube with an inner diameter of 1.8 mm (i.e., Cross-sectional area (B) of 2.54 mm²) was used. The area (C) of the horizontal cross section inside a portion equivalent to the ink containing chamber in the injection state was 2700 mm².

In this specification, the "Duty value" is a value calculated by the following expression.

$$\text{Duty (\%)} = \text{Number of actually discharged dots}/(\text{Vertical resolution} \times \text{Horizontal resolution}) \times 100$$

(In the expression, "Number of actually discharged dots" is the number of the actually discharged dots per unit area and "Vertical resolution" and "Horizontal resolution" each are the resolution per unit area.)

Thereafter, the nozzle check was performed, and then the continuation printing stability (discharge stability) was evaluated according to the following judgment criteria based on the number of nozzles in which nozzle omission occurred. The evaluation results are shown in Tables 1 and 2.

○: The number of nozzles in which nozzle omission occurred was 0 or 1.

Δ: The number of nozzles in which nozzle omission occurred was 2.

×: The number of nozzles in which nozzle omission occurred was 3 or more.

Abrasion Resistance

Patch images with Duty of 100%, Duty of 60%, and Duty of 30% were recorded on a photograph paper (Product name "Photograph paper <Glossy>", manufactured by Seiko Epson Corp.) for each ink using the ink jet printer described above. Then, the abrasion resistance of the images was evaluated by rubbing the patch images with BEM COT (Product Name: BEM COT M-1, manufactured by Asahi Kasei Fibers Corporation.) immediately after the recording and 1 minute after the recording. The evaluation criteria are as follows and the evaluation results are shown in Tables 1 and 2.

○: (Image state in the abrasion resistance test performed immediately after the recording) The base was not seen. (Image state in the abrasion resistance test performed 1 minute later) The image was hardly damaged.

Δ: (Image state in the abrasion resistance test performed immediately after the recording) The base was not seen. (Image state in the abrasion resistance test performed 1 minute later) The damages of image were noticeable.

×: (Image state in the abrasion resistance test performed immediately after the recording) The base was seen.

3.3. Evaluation Results

The evaluation results above are all shown in Tables 1 and 2.

TABLE 1

| Ink composition | | | Examples |||||||||| |
|---|---|---|---|---|---|---|---|---|---|---|---|---|
| | | | 1 | 2 | 3 | 4 | 5 | 6 | 7 | 8 | 9 | 10 |
| Pigment | Self-dispersion pigment | Pigment 1 | 5 | | 5 | 5 | 5 | 5 | 5 | 5 | 5 | 5 |
| | | Pigment 2 | | 5 | | | | | | | | |
| | Resin dispersion pigment | Pigment 3 | | | | | | | | | | |
| Dispersion resin | Styrene acrylic resin | | | | | | | | | | | |
| Resin particles | Superflex 460 (Tg: −21° C., Particle size: 30 nm) | | 1 | 1 | 3 | | | 1 | | | | |
| | Superflex 470 (Tg: −31° C., Particle size: 50 nm) | | | | | 1 | | | 1 | | 1 | |
| | Superflex 740 (Tg: −34° C., Particle size: 200 nm) | | | | | | | | | | | 1 |
| | Mowinyl 727 (Tg: 5° C., Particle size: 60 nm)) | | | | | | | | | 1 | | |
| | Mowinyl 8010 (Tg: 19° C., Particle size: 80 nm)) | | | | | | | | | | | |
| | Mowinyl 8020 (Tg: −20° C., Particle size: 100 nm)) | | | | | | 1 | | | | | |
| Wax particles | Selosol H-620 (Specific gravity: 0.90, Particle size: 200 nm) | | 2 | 2 | 2 | 2 | 2 | | | 2 | | 2 |
| | Polylon L-787 (Specific gravity: 0.95, Particle size: 100 nm) | | | | | | | 2 | 2 | | 2 | |
| Compound A | Trimethylglycine | | 5 | 5 | 5 | 5 | 5 | 5 | 5 | 5 | | 5 |
| Others | Trimethylene glycol monobutyl ether | | 3 | 3 | 3 | 3 | 3 | 3 | 3 | 3 | 3 | 3 |
| | Glycerol | | 5 | 5 | 5 | 5 | 5 | 5 | 5 | 5 | 5 | 5 |
| | Triethylene glycol | | 2 | 2 | 2 | 2 | 2 | 2 | 2 | 2 | 2 | 2 |
| | 1,2-hexanediol | | 5 | 5 | 5 | 5 | 5 | 5 | 5 | 5 | 5 | 5 |
| | 2-pyrrolidone | | 2 | 2 | 2 | 2 | 2 | 2 | 2 | 2 | 2 | 2 |
| | Triethanolamine | | 0.5 | 0.5 | 0.5 | 0.5 | 0.5 | 0.5 | 0.5 | 0.5 | 0.5 | 0.5 |
| | Olfine E1010 | | 1 | 1 | 1 | 1 | 1 | 1 | 1 | 1 | 1 | 1 |
| | Ethylenediamine tetraacetic acid | | 0.02 | 0.02 | 0.02 | 0.02 | 0.02 | 0.02 | 0.02 | 0.02 | 0.02 | 0.02 |
| | Proxel XL2 | | 0.3 | 0.3 | 0.3 | 0.3 | 0.3 | 0.3 | 0.3 | 0.3 | 0.3 | 0.3 |
| | Pure water | | Balance | Balance | Balance | Balance | Balance | Balance | Balance | Balance | Balance | Balance |
| Total (% by mass) | | | 100 | 100 | 100 | 100 | 100 | 100 | 100 | 100 | 100 | 100 |
| (Particle size R1 of resin particles)/(Particle size R2 of wax particles) | | | 0.15 | 0.15 | 0.15 | 0.25 | 0.50 | 0.30 | 0.50 | 0.30 | 0.50 | 1.00 |
| Evaluation results | Continuous printing stability (Discharge stability) | | ○ | ○ | ○ | ○ | ○ | ○ | ○ | ○ | ○ | ○ |
| | Abrasion resistance (Flexibility) | | ○ | ○ | ○ | ○ | ○ | ○ | ○ | Δ | ○ | Δ |
| | Generation of foreign substances | | ○ | ○ | ○ | ○ | ○ | ○ | ○ | ○ | ○ | ○ |

TABLE 2

| Ink composition | | | Comparative Examples |||||||||| |
|---|---|---|---|---|---|---|---|---|---|---|---|---|
| | | | 1 | 2 | 3 | 4 | 5 | 6 | 7 | 8 | 9 | 10 |
| Pigment | Self dispersion pigment | C.I. Pigment Red 122 | | 5 | 5 | 5 | 5 | 5 | 5 | 5 | 5 | 5 |
| | | C.I. Pigment Blue 15:3 | | | | | | | | | | |
| | Resin dispersion pigment | C.I. Pigment Red 122 | 5 | | | | | | | | | |
| Dispersion resin | Styrene acrylic resin | | 1.5 | | | | | | | | | |
| Resin particles | Superflex 460 (Tg: −21° C., Particle size: 30 nm) | | 1 | | | | | 1 | | | | |
| | Superflex 470 (Tg: −31° C., Particle size: 50 nm) | | | | | | | | | 1 | | |

TABLE 2-continued

| | Ink composition | Comparative Examples | | | | | | | | | |
|---|---|---|---|---|---|---|---|---|---|---|---|
| | | 1 | 2 | 3 | 4 | 5 | 6 | 7 | 8 | 9 | 10 |
| | Superflex 740 (Tg: −34° C., Particle size: 200 nm) | | | | | 1 | | | 1 | | |
| | Mowinyl 727 (Tg: 5° C., Particle size: 60 nm)) | | | | | | | | | | |
| | Mowinyl 8010 (Tg: 19° C., Particle size: 80 nm)) | | | | 1 | | | | | | |
| | Mowinyl 8020 (Tg: −20° C., Particle size: 100 nm)) | | | | | | | | | 1 | |
| Wax particles | Selosol H-620 (Specific gravity: 0.90, Particle size: 200 nm) | 2 | 2 | | 2 | | | | | | |
| | Polylon L-787 (Specific gravity: 0.95, Particle size: 100 nm) | | | 2 | | 2 | | | | | |
| Compound A | Trimethylglycine | 5 | 5 | 5 | 5 | 5 | 5 | 5 | 5 | 5 | 5 |
| Others | Trimethylene glycol monobutyl ether | 3 | 3 | 3 | 3 | 3 | 3 | 3 | 3 | 3 | 3 |
| | Glycerol | 5 | 5 | 5 | 5 | 5 | 5 | 5 | 5 | 5 | 5 |
| | Triethylene glycol | 2 | 2 | 2 | 2 | 2 | 2 | 2 | 2 | 2 | 2 |
| | 1,2-hexanediol | 5 | 5 | 5 | 5 | 5 | 5 | 5 | 5 | 5 | 5 |
| | 2-pyrrolidone | 2 | 2 | 2 | 2 | 2 | 2 | 2 | 2 | 2 | 2 |
| | Triethanolamine | 0.5 | 0.5 | 0.5 | 0.5 | 0.5 | 0.5 | 0.5 | 0.5 | 0.5 | 0.5 |
| | Olfine E1010 | 1 | 1 | 1 | 1 | 1 | 1 | 1 | 1 | 1 | 1 |
| | Ethylenediamine tetraacetic acid | 0.02 | 0.02 | 0.02 | 0.02 | 0.02 | 0.02 | 0.02 | 0.02 | 0.02 | 0.02 |
| | Proxel XL2 | 0.3 | 0.3 | 0.3 | 0.3 | 0.3 | 0.3 | 0.3 | 0.3 | 0.3 | 0.3 |
| | Pure water | Balance | Balance | Balance | Balance | Balance | Balance | Balance | Balance | Balance | Balance |
| | Total (% by mass) | 100 | 100 | 100 | 100 | 100 | 100 | 100 | 100 | 100 | 100 |
| | (Particle size R1 of resin particles)/(Particle size R2 of wax particles) | 0.15 | — | — | 0.40 | 2.00 | — | — | — | — | — |
| Evaluation results | Continuous printing stability (Discharge stability) | ○ | ○ | ○ | × | ○ | × | × | × | × | × |
| | Abrasion resistance (Flexibility) | ○ | × | × | × | × | ○ | ○ | ○ | ○ | × |
| | Generation of foreign substances | × | ○ | ○ | × | ○ | × | × | × | × | ○ |

The evaluation results of Table 1 showed that the ink jet recording ink according to each Example is hard to generate foreign substances (aggregate), has god continuous printing stability (discharge stability), and can record images with good abrasion resistance (fixability).

On the other hand, the ink jet recording ink according to each Comparative Example does not satisfy at least one or more conditions of (a) using a self-dispersion pigment, (b) using resin particles having a glass transition temperature of 10° C. or lower, (c) using wax particles with a specific gravity smaller than the specific gravity of the main solvent, and (d) the ratio (R1/R2) of the volume average particle size (R1) of the resin particles and the volume average particle size (R2) of the wax particles being 1.0 or lower. Therefore, as shown in the evaluation results of Table 2, it was shown that at least one problem among the generation of foreign substances, the reduction in continuation printing stability, and the reduction in abrasion resistance occurred.

The entire disclosure of Japanese Patent Application No. 2012-242485, filed Nov. 2, 2012 is expressly incorporated by reference herein.

What is claimed is:

1. An ink jet recording ink, which is contained in an ink containing vessel, the ink jet recording ink comprising:
a self-dispersion pigment;
resin particles having a glass transition temperature of 10° C. or lower; and
wax particles whose specific gravity is smaller than a specific gravity of a main solvent,
the ink containing vessel having:
an ink containing chamber containing the ink; and
an air introduction flow path which introduces air into the ink containing chamber through the ink contained in the ink containing chamber, and
a ratio (R1/R2) of a volume average particle size (R1) of the resin particles and a volume average particle size (R2) of the wax particles being 1.0 or lower.

2. The ink jet recording ink according to claim 1, wherein a weight change of the ink after 2.0 grams of the ink is deposited in a laboratory dish having a diameter of 7.0 cm, when the ink is held in an equilibrium state at 25° C. at 60% RH, and then left standing for 24 hours under the conditions of 25° C. and 70% RH and the conditions of 25° C. and 30% RH is in a range of ±10%.

3. The ink jet recording ink according to claim 2, wherein the ink contains a compound and the compound is an amphoteric compound.

4. The ink jet recording ink according to claim 1, wherein the wax particles contain a polyolefin wax or a paraffin wax.

5. An ink jet recording system, comprising:
an ink containing vessel containing the ink according to claim 1;
an ink jet recording head for discharging the ink supplied from the ink containing vessel; and
an ink supply path for supplying the ink to the head from the ink containing vessel,
the ink containing vessel having an ink containing chamber containing the ink and an air introduction flow path for introducing air into the ink containing chamber through the ink contained in the ink containing chamber.

6. An ink jet recording system, comprising:
an ink containing vessel containing the ink according to claim 2;
an ink jet recording head for discharging the ink supplied from the ink containing vessel; and
an ink supply path for supplying the ink to the head from the ink containing vessel, the ink containing vessel having an ink containing chamber containing the ink and an air introduction flow path for introducing air into the ink containing chamber through the ink contained in the ink containing chamber.

7. An ink jet recording system, comprising:
an ink containing vessel containing the ink according to claim 3;
an ink jet recording head for discharging the ink supplied from the ink containing vessel; and
an ink supply path for supplying the ink to the head from the ink containing vessel,
the ink containing vessel having an ink containing chamber containing the ink and an air introduction flow path for introducing air into the ink containing chamber through the ink contained in the ink containing chamber.

8. An ink jet recording system, comprising:
an ink containing vessel containing the ink according to claim 4;
an ink jet recording head for discharging the ink supplied from the ink containing vessel; and
an ink supply path for supplying the ink to the head from the ink containing vessel,
the ink containing vessel having an ink containing chamber containing the ink and an air introduction flow path for introducing air into the ink containing chamber through the ink contained in the ink containing chamber.

9. The ink jet recording system according to claim 5, wherein a ratio (A/B) of an area (A) of a horizontal cross section inside the ink containing chamber when supplying the ink to the head, and an area (B) of a cross section of the ink supply path is 300 or more.

10. The ink jet recording system according to claim 5, wherein a ratio (C/B) of an area (C) of a horizontal cross section inside the ink containing chamber when injecting the ink into the ink containing chamber, and the area (B) of the cross section of the ink supply path is 900 or more.

11. The ink jet recording system according to claim 5, wherein a ratio (C/A) of the area (A) of the horizontal cross section inside the ink containing chamber when supplying the ink to the head, and the area (C) of the horizontal cross section inside the ink containing chamber when injecting the ink into the ink containing chamber is 2.5 or more.

12. The ink jet recording ink according to claim 1 or claim 2, wherein the ink contains a compound in which a weight change of the compound and a remaining moisture amount of the compound, after 2.0 grams of the compound is deposited in a laboratory dish that is 7.0 cm in diameter, when a 50% by mass aqueous solution of the compound is left standing for 24 hours under the conditions of 30° C. and 35% RH is 10% or more, and when the compound is held in an equilibrium state at 25° C. and 60% RH, and then left standing for 24 hours under the conditions of 25° C. and 70% RH and the conditions of 25° C. and 30% RH is in the range of ±10%.

* * * * *